United States Patent
Skillings

(10) Patent No.: US 7,048,129 B2
(45) Date of Patent: May 23, 2006

(54) SYSTEM AND METHOD FOR PROCESSING LIQUID

(76) Inventor: Roger B. Skillings, 45 Pierce La., Hollis, NH (US) 03049

( * ) Notice: Subject to any disclaimer, the term of this patent is extended or adjusted under 35 U.S.C. 154(b) by 183 days.

(21) Appl. No.: 10/720,365

(22) Filed: Nov. 24, 2003

(65) Prior Publication Data
US 2005/0109409 A1    May 26, 2005

(51) Int. Cl.
*B01O 27/08* (2006.01)
(52) U.S. Cl. .................. 210/424; 210/444; 210/446; 137/625.47
(58) Field of Classification Search ........... 210/424 O, 210/433.1, 443, 444, 446, 447, 448; 137/625.47
See application file for complete search history.

(56) References Cited

U.S. PATENT DOCUMENTS

| | | | |
|---|---|---|---|
| 1,205,513 A | 11/1916 | Carlson | |
| 1,507,806 A * | 9/1924 | Zeller et al. ................ | 210/424 |
| 2,275,750 A | 3/1942 | Genetti et al. | |
| 3,175,342 A | 3/1965 | Balogh | |
| 3,306,451 A | 2/1967 | Kudlaty | |
| 3,907,688 A * | 9/1975 | Close ......................... | 210/424 |
| 3,962,815 A * | 6/1976 | Christensen .................... | 43/4 |
| 4,335,574 A | 6/1982 | Sato et al. ..................... | 60/311 |
| 4,379,053 A | 4/1983 | Brane ........................ | 210/234 |
| 4,381,643 A | 5/1983 | Stark .......................... | 60/303 |
| 4,481,110 A | 11/1984 | Shannon ..................... | 210/199 |
| 4,512,147 A | 4/1985 | Wong ......................... | 60/274 |
| 5,139,050 A * | 8/1992 | Otto ...................... | 137/625.29 |
| 5,192,436 A * | 3/1993 | Sasaki et al. ............... | 210/264 |
| 5,833,849 A | 11/1998 | Primdahl .................... | 210/232 |
| 5,935,426 A * | 8/1999 | Giordano et al. ............. | 210/87 |

* cited by examiner

*Primary Examiner*—John Fox
(74) *Attorney, Agent, or Firm*—Peter A. Nieves; Sheehan Phinney Bass & Green, PA

(57) ABSTRACT

A device for processing liquid with a main body having a valve housing chamber with a main inlet port and a main outlet port along a non-horizontal axis; a liquid inlet processing port and a liquid outlet processing port. The valve housing chamber has a rotatable valve mounted within and moves from a position allowing the liquid to flow from the main inlet port to the main outlet port to a position that directs the flow from the main inlet port to the inlet processing port and directs a flow from the outlet processing port to the main outlet port. The device also has a processing chamber along a vertical axis, receiving the flow from the inlet processing port, processing the liquid, and directing the flow into the outlet processing port.

32 Claims, 8 Drawing Sheets

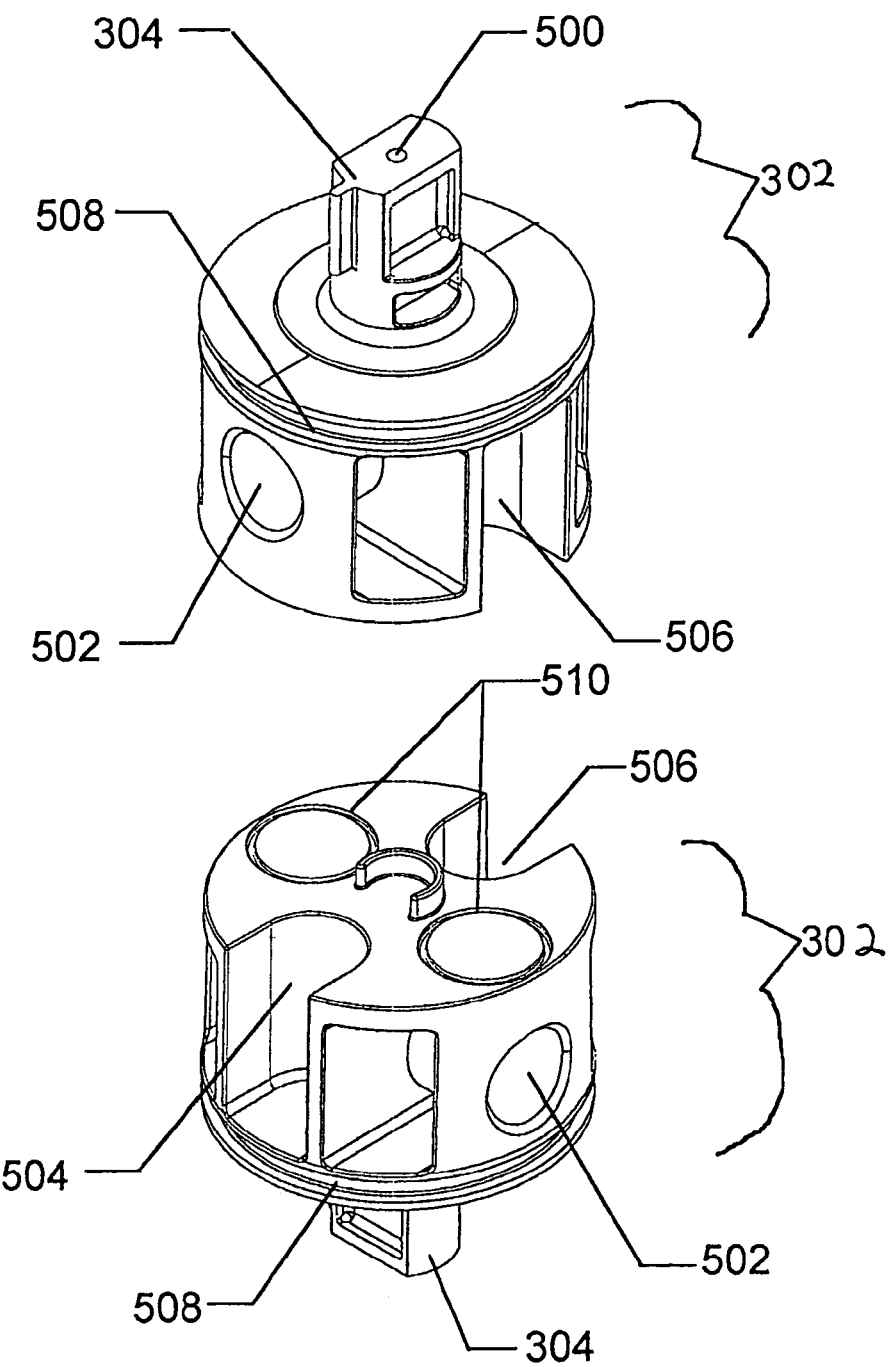

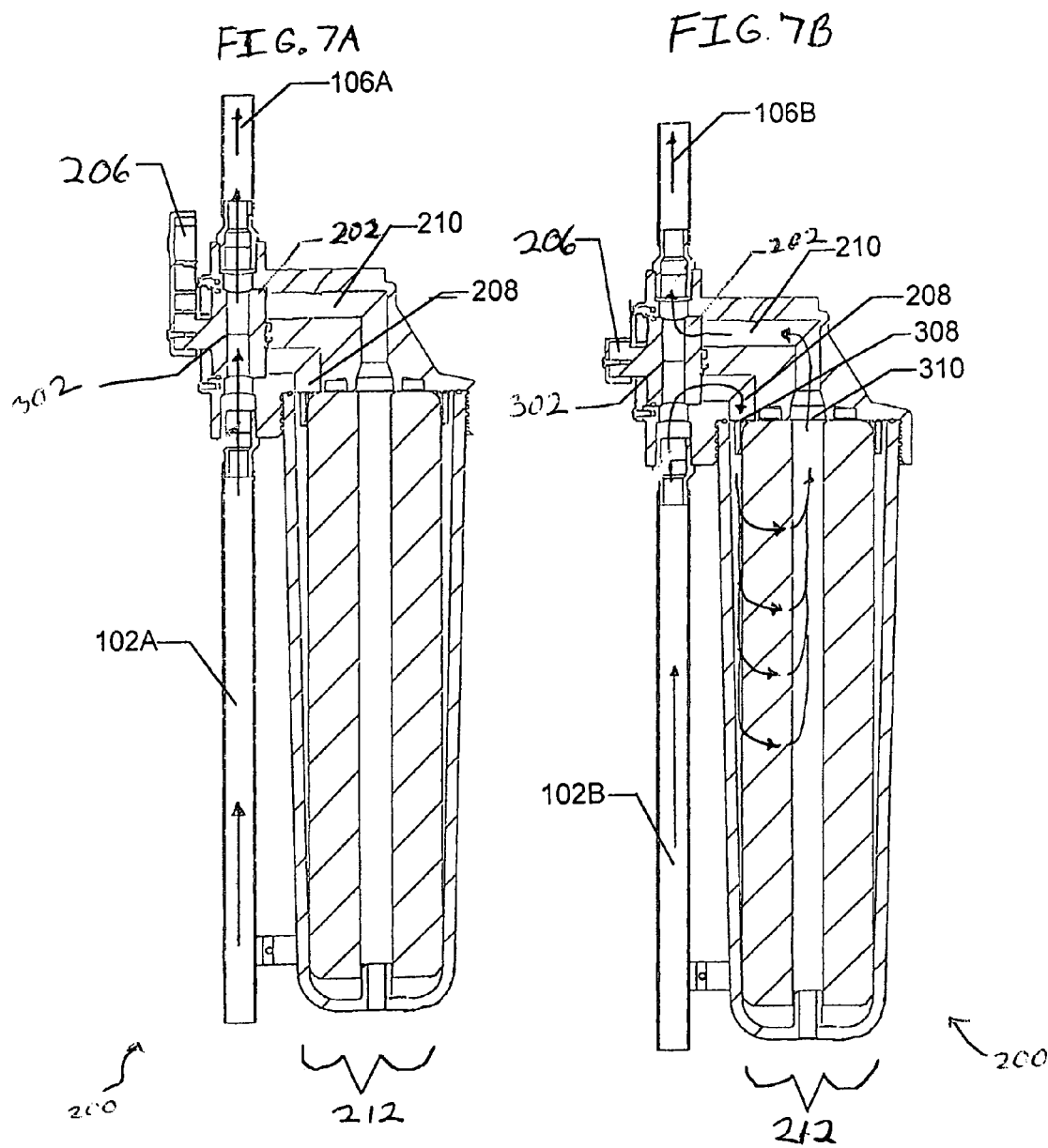

SYSTEM AND METHOD FOR PROCESSING LIQUID

FIELD OF THE INVENTION

The present invention generally relates to a device for processing liquid. More specifically, the invention is related to a device for directing the flow of liquid through a chamber such as, but not limited to, a filter.

BACKGROUND OF THE INVENTION

People often prefer water that has been purified prior to drinking. Even when cooking with water not entirely purified, people can notice an unsatisfying taste imparted into the food by the unpurified water used to cook the food. Although water is usually purified at local municipality water treatment plants, the purified water can still have unwanted additives resulting in an off or unsatisfying taste. The treatment process itself often imparts small amounts of chlorine or other chemicals that affect taste of the water. In addition, as water travels through community supply pipes and household plumbing, alien particles can enter a stream of water, thereby altering taste and reducing purity. In many rural areas wells are used to supply household water. Minerals found within the water table can affect the taste of water and leave stains on items cleaned with the well water. For these reasons, water filters have become commonplace in households.

FIG. 1 illustrates a typical connection of a filter 100 into a vertically running pipe. A vertical inlet pipe 102 provides a stream of liquid to a first T-fitting 104 that splits the liquid into a vertical stream and a horizontal stream. The vertical stream bypasses the filter 100 and proceeds on a vertical path exiting through an outlet pipe 106. The horizontal stream is directed to the filter 100 and passes through the filter 100 for processing. Once the liquid is filtered, the liquid is directed back to a second T-fitting 108, where the horizontal stream re-enters the vertical stream before exiting through the outlet pipe 106.

To control the flow of liquid through the filter 100, a set of valves is installed. A first valve 110 is placed between the first T-fitting 104 and second T-fitting 108. When the first valve 110 is open the stream is allowed to flow vertically to the outlet pipe 106 and bypass the filter 100. By closing the first valve 110 the stream is prevented from bypassing the filter 100 and is directed horizontally at the first T-fitting 104 and through the filter 100. A second valve 112 is placed between the first T-fitting 104 and the filter 100. By closing the second valve 112 the flow of incoming liquid is prevented from flowing into the filter 100 during periods of maintenance to the filter 100. A third valve 114 is placed between the filter 100 and the second T-fitting 108. By closing the third valve 114 the flow of exiting liquid is prevented from flowing into the filter 100 during periods of maintenance. When the filter 100 is in operation the first valve 110 is closed and the second valve 112 and third valve 114 are opened. The liquid is prevented from bypassing the filter 100 by directing it horizontally into the filter 100 and then returning the flow back to the vertical pipe 102. When the filter 100 is closed for repair or maintenance, the first valve 110 is opened and the second valve 112 and third valve 114 are closed. This allows the liquid to flow vertically, thereby bypassing the filter 100 and preventing the flow of liquid into the filter 100.

The addition of a filter 100 to a vertical run pipe can become cost prohibitive. To add the filter 100 as shown in FIG. 1 a variety of components must be installed. These components include two T-fittings, two elbows, three valves, and the necessary piping to connect the components. To install the filter, a portion of the vertical piping is removed. The two T-fittings and one of the valves are installed in place of the removed portion. The other two valves, two elbows, and filter are installed between the two T-fittings. Multiple sections of pipe are cut and soldered to individual components. This procedure often requires the skills of a professional plumber to install the components and filter. In addition, support brackets or other structures may be required to support the filter and additional plumbing components.

While filters 100 have been designed to connect onto a horizontally running section of pipe, many filters and other liquid processing devices cannot be used on spans of vertically running pipe. Some liquid processing chambers, by nature of their design, require that the processing chamber runs in a vertical direction. For example, a gravity filter may be required to run vertically to allow the sediment to settle at the bottom of the filter, or a chemical feeder may require the solids to settle at the bottom of the chamber, preventing too rapid of disbursement of the solid into the liquid stream. For these processing chambers, additional pipe may be required to provide a horizontal run of pipe to attach the filter. Issues such as space and accessibility of the processing chamber can often present problems in installation.

Thus, a heretofore unaddressed need exists in the industry to address the aforementioned deficiencies, inconveniences, and inadequacies.

SUMMARY OF THE INVENTION

Embodiments of the present invention provide systems and methods for processing liquid. Briefly described, in architecture, one embodiment of the system, among others, can be implemented as follows.

The system contains a main body having a valve housing chamber with a main inlet port and a main outlet port along a non-horizontal axis, and a liquid inlet processing port and a liquid outlet processing port. The system also has a rotatable valve mounted within the valve housing chamber moving from a position that directs a flow of liquid from the main inlet port to the main outlet port to a position that directs a flow of liquid from the main inlet port to the inlet processing port and directs a flow from the outlet processing port to the main outlet port. In addition, the system has a processing chamber along a vertical axis, receiving a flow from the inlet processing port, processing the liquid, and directing the flow into the outlet processing port.

The present invention also provides a method of processing liquid, comprising the steps of: receiving a flow of liquid parallel with an axis aligned with gravity; directing the flow from a main inlet port to a main outlet port with the flow being parallel with the gravity axis and preventing the flow from entering an inlet processing port and an outlet processing port when a valve is in a first position; directing the flow from the main inlet port to the inlet processing port, directing the flow from the outlet processing port to the main outlet port, and preventing the flow from directly flowing from the main inlet port to the main outlet port when the valve is in a second position; and processing the flow comprising: receiving the flow from the inlet processing port, processing the flow along a vertical axis, and directing the flow into the outlet processing port when the valve is in the second position.

Other devices and advantages of the present invention will be or become apparent to one with skill in the art upon examination of the following drawings and detailed description. It is intended that all such additional devices and advantages be included within this description, be within the scope of the present invention, and be protected by the accompanying claims.

The present liquid processing device allows the device to be connected to a vertical or vertically sloped pipe without the additional plumbing. The liquid processing device provides the additional benefits of not requiring additional plumbing or the increased complexity that would necessitate a professional plumber.

BRIEF DESCRIPTION OF THE DRAWINGS

The present invention will be more fully understood from the detailed description given below and from the accompanying drawing of the embodiments of the invention, which, however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

FIG. 5A is a schematic diagram providing a top perspective view of the valve of FIG. 3.

FIG. 5B is a schematic diagram providing a bottom perspective view of the valve of FIG. 5A.

FIG. 7A is a schematic diagram providing a cross-sectional view of the liquid processing device connected to the inlet pipe and outlet pipe with arrows depicting the flow of liquid in bypass mode.

FIG. 7B is a schematic diagram providing a cross-sectional view of the liquid processing device connected to the inlet pipe and outlet pipe with arrows depicting the flow of liquid in processing mode.

DETAILED DESCRIPTION

Figure 1:
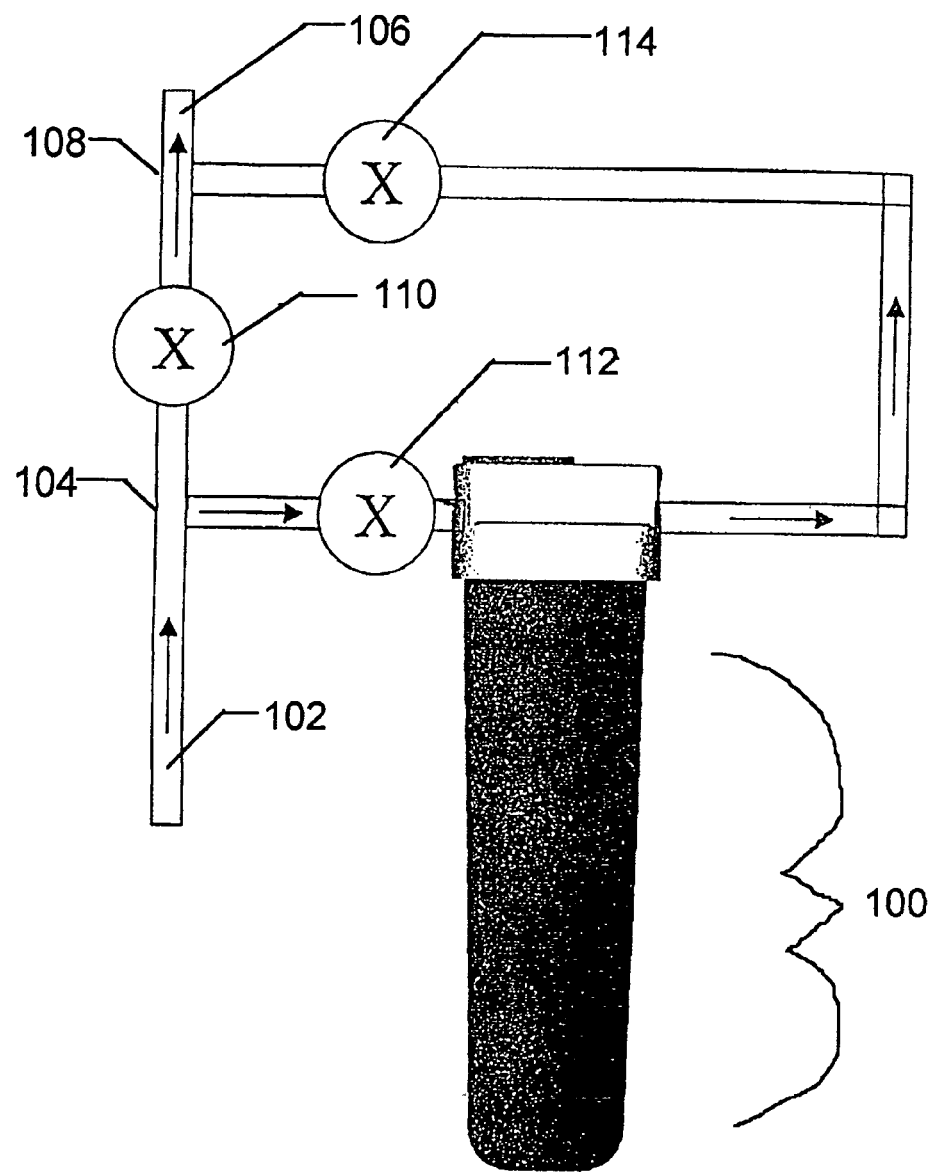
FIG. 1 illustrates a typical water filter connected to a vertically running pipe.
Figure 2:
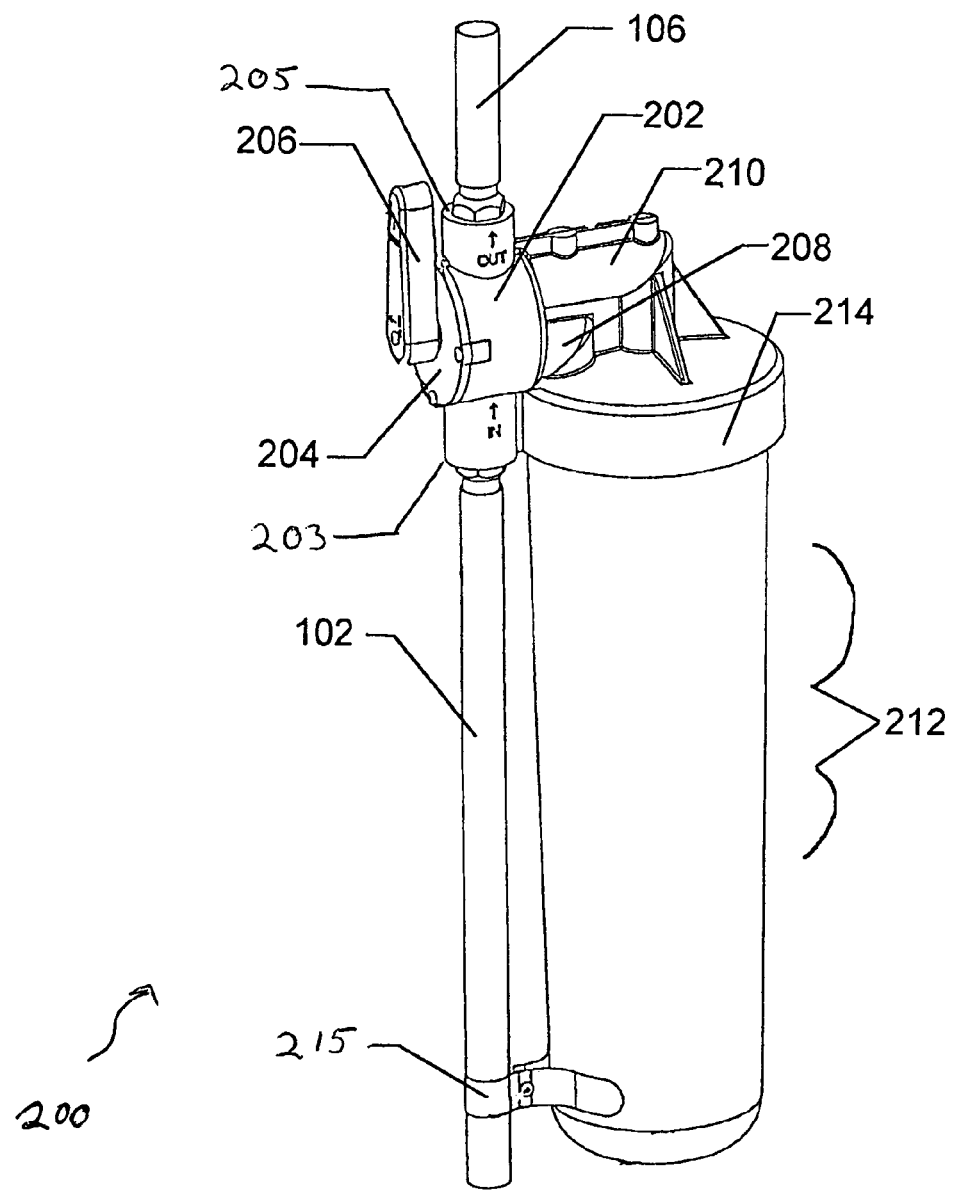
FIG. 2 is a schematic diagram providing a top perspective view of a liquid processing device connected to an inlet pipe and an outlet pipe, in accordance with a first exemplary embodiment of the invention.

FIG. 2 is a schematic diagram providing a top perspective view of a liquid processing device 200 connected to an inlet pipe 102 and an outlet pipe 106, in accordance with a first exemplary embodiment of the invention. The inlet pipe 102 and outlet pipe 106 connect to a main housing 202. The inlet pipe 102 connects to a bottom of the main housing 202 at a main inlet port 203 and the outlet pipe 106 connects to the top of the main housing 202 at a main outlet port 205. It should be understood that in different embodiments of the invention the direction of flow could be reversed, i.e., the inlet pipe 102 could be connected to the top and the outlet pipe 106 can be connected to the bottom of the main housing 202. A variety of connections can be used to connect the inlet pipe 102 and outlet pipe 106 to the main housing 202, as would be understood by those having ordinary skill in the art. For example, the connections can be, but are not limited to, a compression fitting, a soldered connection, a hose clamp connection, or a quick release connection.

Figure 3:
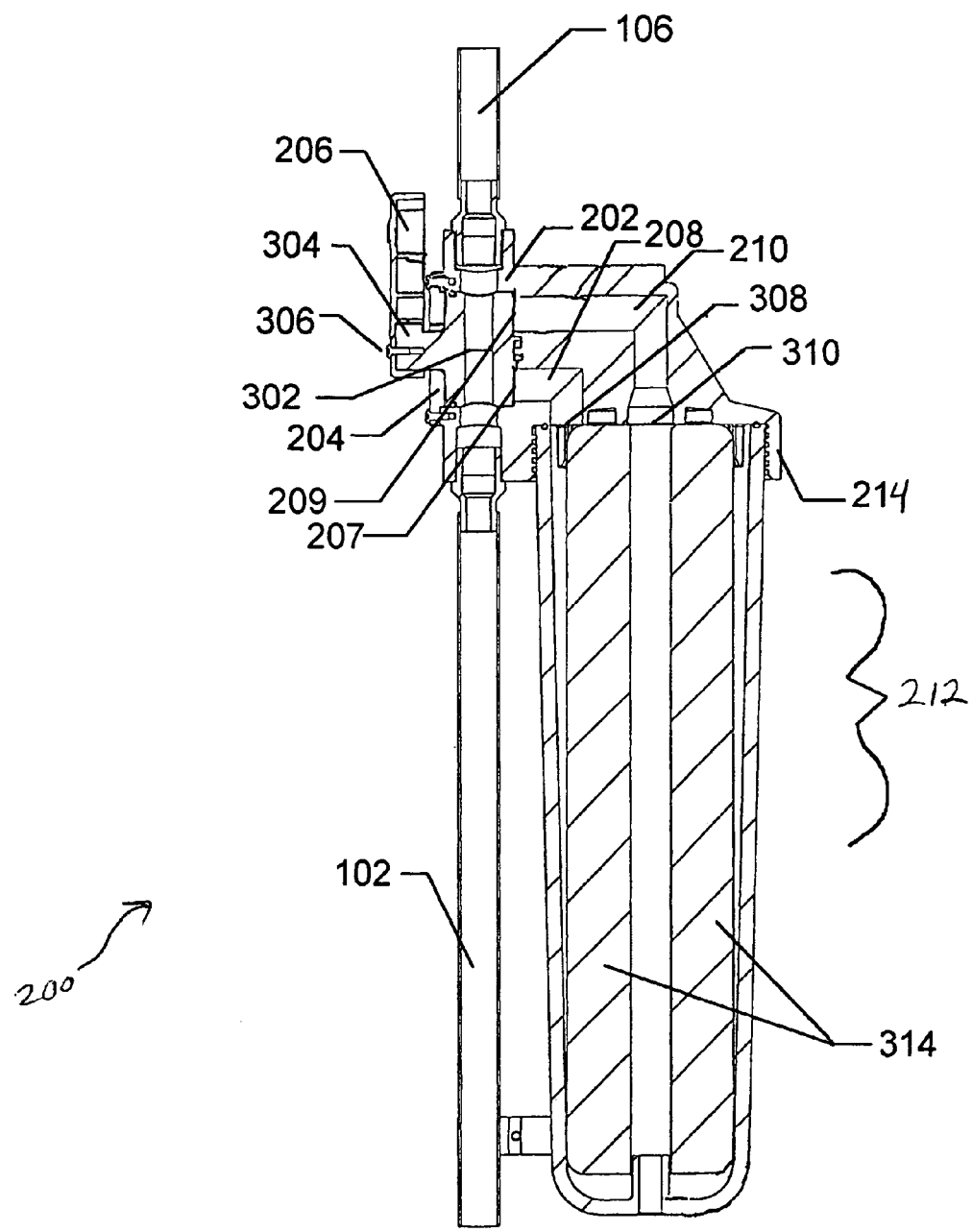
FIG. 3 is a schematic diagram providing a cross-sectional view of the liquid processing device of FIG. 2.

The main housing 202 has a valve housing chamber 406 (FIG. 4B) therein. A valve 302 (FIG. 3) controls the flow of liquid and is sited within the valve housing chamber 406 (FIG. 4B). Both the valve and valve housing chamber are described in greater detail below. A valve housing cover 204 secures the valve 302 (FIG. 3) in the valve housing chamber 406 (FIG. 4B). A portion of the valve 302 (FIG. 3) extends through a hole in the valve housing cover 204. A lever 206 attaches to the portion of the valve 302 (FIG. 3). The valve housing cover 204 is fastened to the main housing 202 by screws, bolts, glue, or other fasteners that would be understood by those having ordinary skill in the art. Gaskets or other sealants (not shown) can be used to prevent the flow or leaking of liquid around the valve housing cover 204. The lever 206 is used to control the flow of liquid within the main housing 202. When the lever 206 is parallel with the inlet pipe 102 and outlet pipe 106, the flow is directed from the inlet pipe 102 directly to the outlet pipe 106. When the lever 206 is rotated perpendicular to the inlet pipe 102 and outlet pipe 106, the flow is directed into and out of an inlet processing channel 208 via the inlet processing port 207 and an outlet processing channel 210 via the outlet processing port 209, respectively. The inlet processing channel 208 and outlet processing channel 210 direct the flow of liquid from the main housing 202 to and from the liquid processing chamber 212. The liquid processing chamber 212 connects to the inlet 208 and outlet processing channels 210 via a processing chamber port 214. The processing chamber port 214 supports the processing chamber 212 to the inlet 102 and outlet pipes 106. The processing chamber 212 can also be secured to the inlet pipe 102 or outlet pipe 106 with a stabilizer 215. The stabilizer 215 (described later in more detail) clamps around the inlet pipe 102 and provides support for the processing chamber 212.

The liquid processing chamber 212 can perform a variety of different functions. In one embodiment, the liquid processing chamber 212 is a filter. It should be understood by one having ordinary skill in the art that the filter can comprise a variety of filters, for example but not limited to, gravity filters, osmosis filters, chemical filters, or ionizing filters. In addition, the liquid processing chamber 212 is not limited to filters. The liquid processing chamber 212 can comprise other liquid processing chambers, for example but not limited to, solid/liquid dispersing chambers, homogenizers, and samplers.

FIG. 3 is a schematic diagram providing a cross-sectional view of the liquid processing device 200 of FIG. 2. Connectors are fastened to the inlet pipe 102 and outlet pipe 106 at the main inlet port 203 and main outlet port 205, respectively. The connectors are screwed to the main housing 202. Of course, the connectors may be connected to the main housing via different means. The valve 302 (discussed below in greater detail) directs the flow of liquid from the inlet pipe 102 to the outlet pipe 106. The lever 206 is connected to a lever portion 304 of the valve 302 that extends behind the valve housing cover 204. A screw 306, or other fastening device, holds the lever 206 onto the valve 302. The valve housing cover 204 is held into place by a fastening device, such as, but not limited to, a series of screws. By rotating the lever 206 so that a central axis of the lever 206 is perpendicular to a central axis of the inlet pipe 102, the flow of liquid can be directed into the inlet processing channel 208 and out of the outlet processing channel 210. The inlet processing channel 208 receives the stream of liquid and directs the liquid to a processing chamber inlet port 308 of the liquid processing chamber 212. The outlet processing channel 210 receives the stream of liquid from a processing chamber outlet port 310 of the liquid processing chamber 212 and directs the liquid back to the main housing 202. The valve 302 directs the flow of liquid into the outlet pipe 106 by preventing liquid from flowing back toward the inlet pipe 102.

It should be noted that, in accordance with the first exemplary embodiment shown by FIG. 3, a filter 212 is utilized as the liquid processing chamber 212. It should be noted, however, that other devices may be utilized as the liquid processing chamber 212. The filter 212 mounts to the inlet processing channel 208 and the outlet processing channel 210 via the processing chamber port 214. In this example, the filter 212 is attached via threads located on the processing chamber port 214. The flow of liquid is directed to the processing chamber inlet port 308 and down the walls of the filter 212. The stream of liquid flows through filter material 314 and up the center of the filter 212. The liquid returns to the main housing 202 through the processing chamber outlet port 310 and the outlet processing channel 210.

Figure 4A:
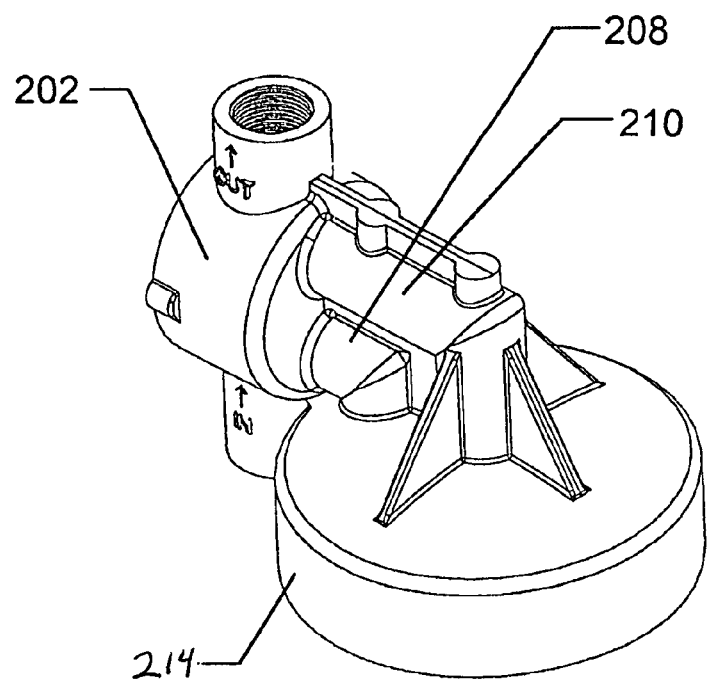
FIG. 4A is a schematic diagram providing a top perspective view of the main housing of FIG. 3.
Figure 4B:
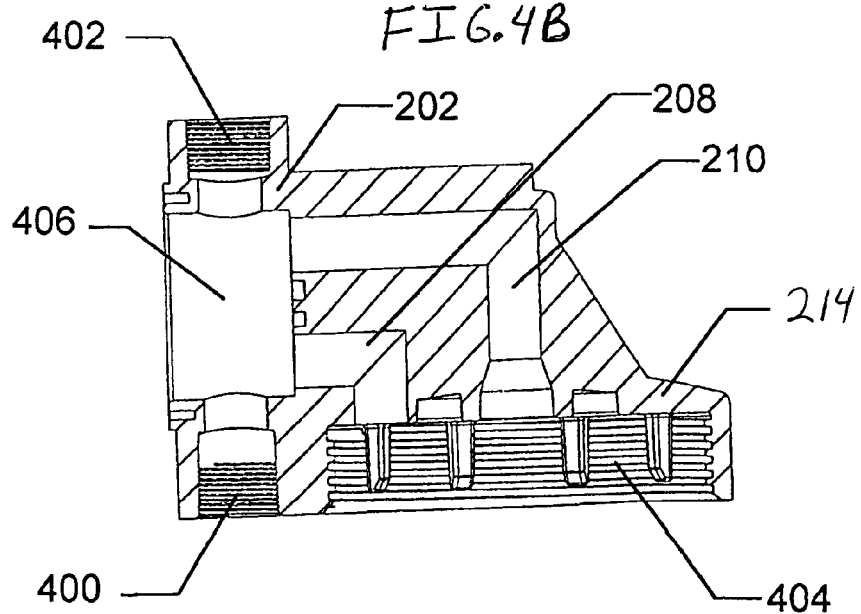
FIG. 4B is a schematic diagram providing a cross-sectional view of the main housing of FIG. 4A.

FIG. 4A is a schematic diagram providing a top perspective view of the main housing 202 of FIG. 3. In addition, FIG. 4B is a cross-sectional view of the main housing 202 of FIG. 4A. Referring to FIGS. 4A and 4B, the main housing 202, inlet and outlet processing channels 208 and 210, and processing chamber port 214 are shown not connected to the inlet pipe 102, the outlet pipe 106, or the liquid processing chamber 212. Threads 400, 402, and 404 for connecting the inlet pipe, the outlet pipe, and the processing chamber, respectively, are displayed by FIG. 4B. The valve 302 (FIG. 3) fits within the valve housing chamber 406. In one embodiment the main housing 202, inlet and outlet channels 208 and 210, and processing chamber port 214 are molded as a single unit. However, it should be understood by one having ordinary skill in the art that the individual components could be molded separately and later be permanently or removably fastened together by mechanical fasteners or glue. It should also be appreciated that these components can be manufactured from a variety of materials, for example but not limited to, plastics, metals, ceramics, or composites.

In accordance with the first exemplary embodiment of the invention, the inlet and outlet processing channels 208 and 210 are rotatably connected to the main housing 202. This embodiment allows the liquid processing chamber 212 to hang vertically when the main housing 202 is connected to the inlet and outlet pipes 102, 106 that rise vertically. The amount of rotation of the inlet and outlet processing channels 208, 210 could be adjusted based on the slope of the inlet and outlet pipes 102, 106. In accordance with an alternative embodiment, the inlet and outlet pipes 102, 106 form a slope of 45 degrees; the inlet and outlet processing channels 208, 210 connect to the main housing 202 at a 45 degree angle allowing the liquid processing chamber 212 to hang perpendicular to the ground. The connection of the inlet and outlet processing channels 208, 210 to the main housing 202 can be accomplished by a bearing connection or can be screwed into place against a gasket. Of course, other connection means may be substituted.

Referring to FIGS. 5A and 5B, a top and bottom view of the valve 300, respectively, is shown. The valve 300 has the lever portion 304 that extends beyond the valve housing cover 204 (FIG. 3) to connect to the lever 206 (FIG. 3). The lever portion 304 of the valve 302 can be shaped to allow the lever 206 (FIG. 3) to rotate the valve 302 without slipping. A screw hole 500 can be provided on top of the lever portion 304 to allow the lever 206 (FIG. 3) to be connected to the valve 302. The valve 302 has a center channel 502 that allows the flow of liquid directly through the valve 302 when the ends of the center channel 502 are aligned with the inlet and outlet pipes 102, 106 (FIG. 3). Perpendicular to the center channel 502, the valve 302 has a first elbow channel 504 and a second elbow channel 506. The first elbow channel 504 receives the vertical flow from the inlet pipe 102 (FIG. 3) and directs the flow horizontally out the inlet processing channel 208 (FIG. 3). The second elbow 506 receives the horizontal flowing liquid from the outlet processing channel 210 (FIG. 3) and directs the flow vertically out the outlet pipe 106.

When the valve 302 is rotated and the elbow channels 504 and 506 are aligned with the inlet and outlet pipes 102, 106 (FIG. 3), the flow of liquid is directed to the liquid processing chamber 212 (FIG. 3) via the inlet and outlet processing channels 208, 210 (FIG. 3). A cover gasket 508 prevents leaking of liquid from the valve housing cover 204. Two small gaskets 510 on the bottom of the valve 302 prevent leaking from the inlet and outlet processing channels 208, 210 (FIG. 3) when the valve 302 is positioned to bypass the liquid processing chamber 212 (FIG. 3).

Figure 6A:
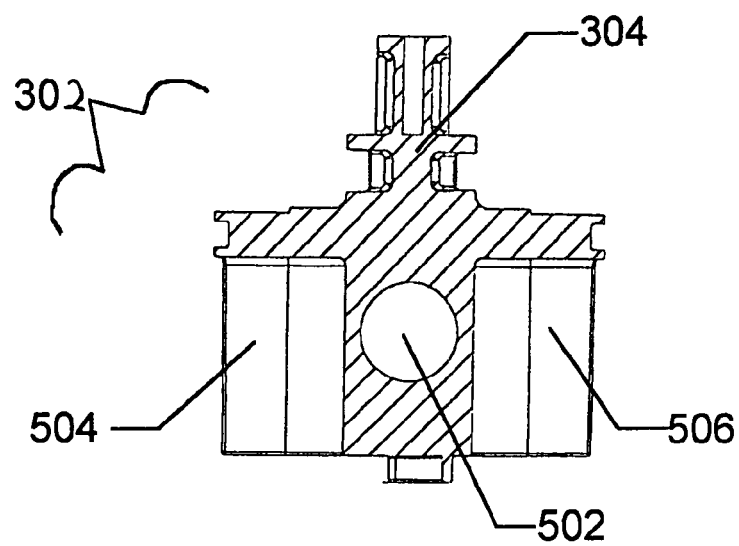
FIG. 6A is a schematic diagram providing a cross-sectional view of the valve of FIG. 5B.

FIG. 6A is a schematic diagram providing a cross-sectional view of the valve 302 of FIG. 5A. The center channel 502 is shown aligned with the direction of view (FIG. 6A). Walls of the first and second elbows 504 and 506 are shown on the bottom periphery of the valve 302.

Figure 6B:
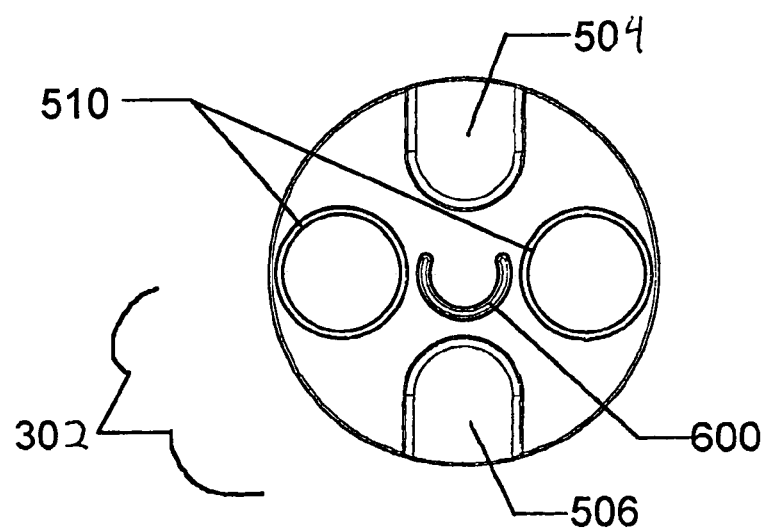
FIG. 6B is a schematic diagram providing a bottom view of the valve of FIG. 6A.

FIG. 6B is a schematic diagram providing a bottom view of the valve of FIG. 5A. A valve guide 600 located on the bottom of the valve 302 holds the valve 302 in the center of the valve housing chamber 406 (FIG. 4B), while allowing the valve 302 to rotate within the valve housing chamber 406 (FIG. 4B). The two elbows 504 and 506 are shown along with the two gaskets 510 that prevent leaking when the valve 302 is positioned to by-pass the liquid processing chamber 212 (FIG. 3).

FIG. 7A is a schematic diagram illustrating liquid flow via use of the liquid processing device 200, when the lever 206 is vertical. Referring to FIG. 7A, the lever 206 is aligned in the vertical direction allowing the liquid to bypass the filter 212. The liquid flows from the inlet pipe 102 into the main housing 202 and through the valve 302, via the center channel 502. The liquid exits the valve 302 through the center channel 502 and enters the outlet pipe 106. The valve 302 prevents the flow of liquid into and out of the inlet and outlet processing channels 208, 210.

FIG. 7B is a schematic diagram illustrating liquid flow via use of the liquid processing device 200, when the lever 206 is horizontal. Referring to FIG. 7B, the lever 206 is aligned perpendicular to a central axis of the inlet and outlet pipes 102, 106. The liquid flows from the inlet pipe 102 into the main housing 202, and into the valve 302. The first elbow channel 504 (FIG. 5B) of the valve 302 directs the liquid from a vertical direction to a horizontal direction, out of the main housing 202 into the inlet processing channel 208. The inlet processing channel 208 directs the liquid horizontally and directs it in a direction vertically parallel with the inlet and outlet pipes 102, 106 into the processing chamber inlet port 308. The liquid flows down around the perimeter walls of the filter 212. The liquid passes through the filter material 314 (FIG. 3) toward the center of the filter 212 and then up through the processing chamber outlet port 310. The outlet processing channel 210 receives the liquid flowing in a vertical direction and directs the flow horizontally into the main housing 202. The second elbow 506 (FIG. 5B) of the valve 302 directs the horizontal flow into a vertical flow and out the main housing 202. The liquid then enters the outlet pipe 106.

Figure 8A:
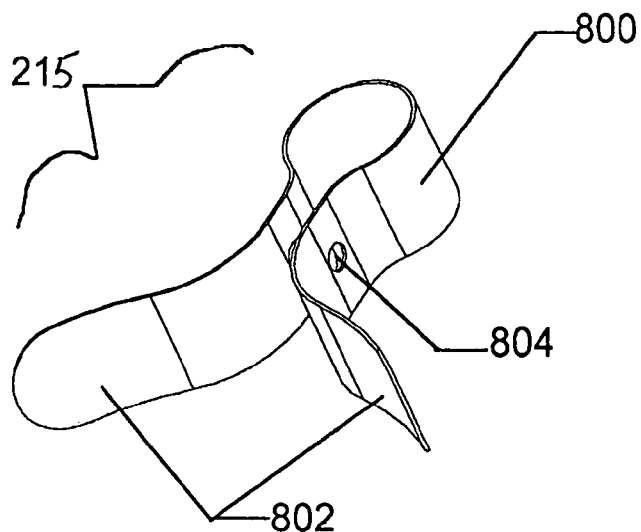
FIG. 8A is a schematic diagram providing a top perspective view of the liquid processing chamber stabilizer.
Figure 8B:
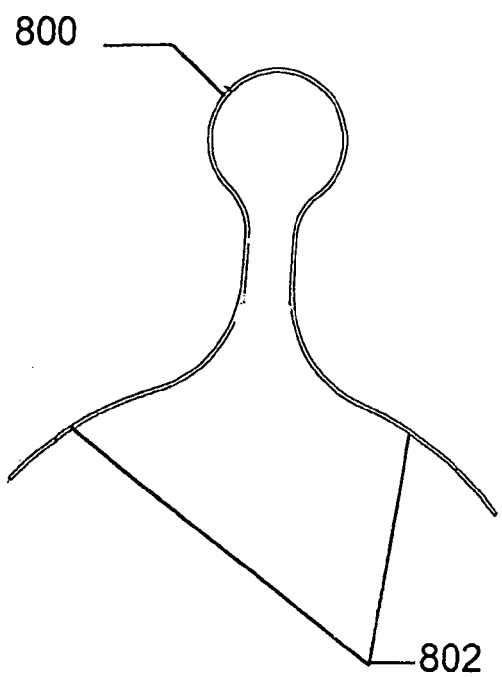
FIG. 8B is a schematic diagram providing a top profile of the liquid processing chamber stabilizer.
Figure 8C:
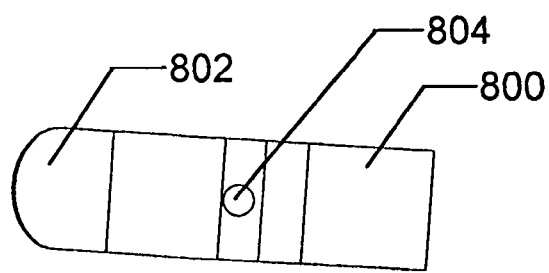
FIG. 8C is a schematic diagram providing a side profile of the liquid processing chamber stabilizer.

FIGS. 8A, 8B, and 8C are schematic diagrams providing different views of the liquid processing chamber stabilizer 215 of FIG. 2. Referring to FIGS. 8A, 8B, and 8C, the liquid processing chamber stabilizer 215 comprises a clamp portion 800 and two arms 802. The clamp portion 800 wraps around the inlet pipe 102 (FIG. 3). The two arms 802 extend around sides of the liquid processing chamber 212 (FIG. 3) providing horizontal support. A fastener may be placed through a fastener hole 804 to secure the clamp portion 800 around the inlet pipe 102 (FIG. 3). In one embodiment, a screw positioned between the inlet pipe 102 (FIG. 3) and the liquid processing chamber 212 (FIG. 3) is used to secure the clamp portion 800 around the inlet pipe 102 (FIG. 3). It should be appreciated by one having ordinary skill in the art that the stabilizer 215 can be manufactured using a variety of materials. Examples of material used may be, but are not limited to, plastics, metals, or composites.

In another embodiment (not shown) the arms 802 extend and wrap around the liquid processing chamber 212 (FIG. 3). A fastener located between the inlet pipe 102 (FIG. 3) and the liquid processing chamber 212 (FIG. 3) secures the arms. The fastener secures the stabilizer 215 around both the inlet pipe 102 (FIG. 3) and the liquid processing chamber 212 (FIG. 3). In this embodiment the stabilizer 215 provides greater support to the liquid processing chamber 212 (FIG. 3). The stabilizer 215 prevents the liquid processing chamber 212 (FIG. 3) from rocking in a horizontal direction and wraps tightly around the liquid processing chamber 212 (FIG. 3) preventing the chamber 212 (FIG. 3) from sliding in a vertical direction.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

I claim:

1. A device for processing liquid, comprising:
   a main body having a valve housing chamber with a main inlet port and a main outlet port along a non-horizontal axis;
   a liquid inlet processing port and a liquid outlet processing port;
   a rotatable valve mounted within the valve housing chamber moving from a position that directs a flow of liquid from the main inlet port to the main outlet port to a position that directs a flow of liquid from the main inlet port to the inlet processing port and directs a flow from the outlet processing port to the main outlet port; and
   a processing chamber along a vertical axis, receiving a flow from the inlet processing port, processing the liquid, and directing the flow into the outlet processing port,
   wherein a pipe is connected to one of the main inlet port and the main outlet port, and a stabilizer connects the processing chamber to the pipe.

2. The device of claim 1, further comprises a liquid inlet processing channel for receiving a flow from the inlet processing port and directing the flow from the valve housing into a processing chamber inlet port and a liquid outlet processing channel for receiving a flow from a processing chamber outlet port and directing a flow to the outlet processing port, and
   wherein the processing chamber receives a flow from the processing chamber inlet port, processes the liquid, and directs the flow into the chamber processing outlet port.

3. The device of claim 2, wherein the inlet processing channel and the outlet processing channel are connected to the processing chamber and the inlet processing channel and outlet processing channel are removably connected to the main body.

4. The device of claim 1, wherein the main inlet port and the main outlet port are along a vertical axis.

5. The device of claim 1, wherein the processing chamber is removably connected to the inlet and outlet processing ports.

6. The device of claim 1, wherein the stabilizer clips around the pipe and supports the sides of the processing chamber.

7. The device of claim 6, wherein a fastener secures the stabilizer around the pipe.

8. The device of claim 1, wherein the processing chamber is one of a filter, a sampling chamber, and a chemical feeder.

9. The device of claim 1, further comprising a lever that rotates the rotatable valve wherein the lever is parallel with the non-horizontal axis when a flow is directed from the main inlet to the main outlet and the lever is perpendicular with the non-horizontal axis when a flow is directed from the main inlet port to the inlet processing port.

10. A device for processing liquid, comprising:
    a main body having a valve housing chamber with a main inlet port and a main outlet port parallel with an axis aligned with gravity;
    a liquid inlet processing port and a liquid outlet processing port perpendicular to the gravity axis;
    a rotatable valve mounted within the valve housing chamber moving from a position that directs a flow of liquid from the main inlet port to the main outlet port to a position that directs a flow parallel with the gravity axis from the main inlet port to a flow perpendicular with the gravity axis out the inlet processing port and directs a flow perpendicular with the gravity axis from the outlet processing port to a flow parallel with the gravity axis out the main outlet port;
    a liquid inlet processing channel for receiving a flow from the inlet processing port and directing a flow perpendicular with the gravity axis from the inlet processing port, to a flow parallel to the gravity axis into a processing chamber inlet port and a liquid outlet processing channel for receiving a flow parallel to the gravity axis from a processing chamber outlet port and directing a flow perpendicular to the gravity axis to the outlet processing port; and a processing chamber receiving a flow parallel to the gravity axis from the processing chamber inlet port, processing the liquid in a direction parallel to the gravity axis, and directing a flow parallel with the gravity axis into the chamber outlet port.

11. The device of claim 10, wherein the processing chamber is removably connected to the inlet and outlet processing channels.

12. The device of claim 10, wherein a pipe is connected to one of the main inlet ports and the main outlet port, and a stabilizer connects the processing chamber to the pipe.

13. The device of claim 12, wherein the stabilizer clips around the pipe and supports the sides of the processing chamber.

14. The device of claim 13, wherein a fastener secures the stabilizer around the pipe.

15. The device of claim 10, wherein the inlet processing channel and outlet processing channel are connected to the processing chamber and the inlet processing channel and the outlet processing channel are removably connected to the main body.

16. The device of claim 10, wherein the processing chamber is one of a filter, a sampling chamber, and a chemical feeder.

17. The device of claim 10, further comprising a lever that rotates the rotatable valve wherein the lever is parallel with the gravity axis when a flow is directed from the main inlet to the main outlet and lever is perpendicular with the gravity axis when a flow is directed from the min inlet port to the inlet processing port.

18. A device for processing liquid, comprising:
a main body having a valve housing chamber with a main inlet port and a main outlet port along a non-horizontal axis;
a liquid inlet processing port and a liquid outlet processing port;
a rotatable valve mounted within the valve housing chamber capable of moving from a position that directs a flow of liquid from the main inlet port to the main outlet port to a position that directs a flow of liquid from the main inlet port to the inlet processing port and directs a flow from the outlet processing port to the main outlet port;
a liquid inlet processing channel for receiving a flow from the inlet processing port and directing a flow from the valve housing into a processing chamber inlet port and an outlet processing channel for receiving a flow from a processing chamber outlet port and directing a flow to the outlet processing port wherein the inlet and outlet processing channels are rotatably connected to the main body allowing a processing chamber to hang along a vertical axis; and
the processing chamber receiving a flow from the processing chamber inlet port, processing the liquid, and directing a flow into the processing chamber outlet ports,
wherein a pipe is connected to one of the main inlet port and the main outlet port, and a stabilizer connects the processing chamber to the pipe.

19. The device of claim 18, wherein the main inlet port and the main outlet port are along a vertical axis.

20. The device of claim 18, wherein the processing chamber is removably connected to the inlet processing channel and the outlet processing channel.

21. The device of claim 18, wherein the stabilizer clips around the pipe and supports the sides of the processing chamber.

22. The device of claim 21, wherein a fastener secures the stabilizer around the pipe.

23. The device of claim 18, wherein the inlet processing channel and the outlet processing channel are connected to the processing chamber and the inlet processing channel and the outlet processing channel are removably connected to the main body.

24. The device of claim 18, wherein the processing chamber is one of a filter, a sampling chamber, and a chemical feeder.

25. A device for processing liquid, comprising:
means for housing having a main inlet port and a main outlet port along a non-horizontal axis;
a liquid inlet processing port and a liquid outlet processing port;
means for controlling liquid flow mounted within the means for housing, the means for controlling liquid flow being capable of moving from a position allowing the liquid to flow from the main inlet port to the main outlet port to a position that directs the flow from the main inlet port to the inlet processing port and directs a flow from the outlet processing port to the main outlet port; and
means for processing located along a vertical axis, receiving the flow from the inlet processing port, processing the liquid, and directing the flow into the outlet processing port,
wherein a pipe is connected to one of the main inlet port and the main outlet port, and a connection means connects the means for processing to the pipe.

26. The device of claim 25, wherein the main inlet port and the main outlet port are along a vertical axis.

27. The device of claim 25, wherein the means for processing is removably connected to the inlet and outlet processing ports.

28. The device of claim 25, wherein the connection means clips around the pipe and supports the sides of the means for processing.

29. The device of claim 28, wherein a fastening means secures the connection means around the pipe.

30. The device of claim 25, wherein the inlet processing channel and the outlet processing channel are connected to the means for processing and the inlet processing channel and outlet processing channel are removably connected to the means for housing.

31. The device of claim 25, wherein the means for processing is one of a filter, a sampling chamber, and a chemical feeder.

32. The device of claim 25, further comprising a lever that rotates the means for controlling liquid flow wherein the lever is parallel with the non-horizontal axis when a flow is directed from the main inlet to the main outlet and the lever is perpendicular with the non-horizontal axis when a flow is directed from the main inlet port to the inlet processing port.

* * * * *